(12) United States Patent
Urban

(10) Patent No.: US 9,194,555 B2
(45) Date of Patent: Nov. 24, 2015

(54) INTELLIGENT, UNIFORMLY ILLUMINATING LINEAR LED TASK LIGHT

(71) Applicant: Boca Flasher, Inc., Boca Raton, FL (US)

(72) Inventor: David A Urban, Delray Beach, FL (US)

(73) Assignee: Boca Flasher, Inc., Boca Raton, FL (US)

( * ) Notice: Subject to any disclaimer, the term of this patent is extended or adjusted under 35 U.S.C. 154(b) by 34 days.

(21) Appl. No.: 14/174,740

(22) Filed: Feb. 6, 2014

(65) Prior Publication Data

US 2014/0225505 A1   Aug. 14, 2014

Related U.S. Application Data

(60) Provisional application No. 61/850,189, filed on Feb. 12, 2013.

(51) Int. Cl.
*F21V 29/00* (2006.01)
*F21V 1/00* (2006.01)
*H05B 33/08* (2006.01)

(52) U.S. Cl.
CPC .............. *F21V 1/00* (2013.01); *H05B 33/0803* (2013.01)

(58) Field of Classification Search
CPC . F21V 7/005; F21V 29/2206; F21V 23/0471; F21S 4/008; F21Y 2103/003; H05B 33/0812; H05B 33/0881; H05B 37/02; H05B 37/029; Y02B 20/48; Y10S 362/80
USPC .............. 362/227, 133, 249.02, 249.06, 240, 362/294, 362, 377, 800; 315/312, 318, 361, 315/294, 297, 291
See application file for complete search history.

(56) References Cited

U.S. PATENT DOCUMENTS

| | | | |
|---|---|---|---|
| 6,641,283 B1 | 11/2003 | Bohler | |
| D603,549 S | 11/2009 | Ng | |
| 7,810,955 B2 | 10/2010 | Stimac et al. | |
| 8,100,552 B2 * | 1/2012 | Spero | 362/231 |
| 8,138,690 B2 * | 3/2012 | Chemel et al. | 315/318 |

\* cited by examiner

*Primary Examiner* — Haiss Philogene
(74) *Attorney, Agent, or Firm* — John J. Yim

(57) ABSTRACT

A unique pattern arrangement, placement density, and wattage sizing of LEDs in a line voltage Linear Task Light produces uniform illumination with negligible point-source shadowing typically seen in other similar LED task lights. A desired energy code compliant 7½ Watts per foot is achieved using a greater number and smaller sized LEDs than in competitor's products, resulting in a better price-point efficiency in terms of dollars per Watt ($/W). The resulting product meets all Leed certification requirements, is California Title 24 compliant, and uses proximity sensing circuitry to further reduce energy consumption by shutting off when the illuminated area is vacant for a period of time. The LED Task Light disclosed is capable of higher illumination when needed, without sacrificing energy code compliancy through the use of timing circuitry to automatically reduce illumination intensity and corresponding energy consumption after a preset time interval.

8 Claims, 7 Drawing Sheets

INTELLIGENT, UNIFORMLY ILLUMINATING LINEAR LED TASK LIGHT

FIELD OF THE INVENTION

The present invention relates to task lights typically mounted above, and in close proximity—usually around 18"—to the work surface being illuminated. Examples include but are not limited to task lights mounted under overhead storage bins on the wall panels of modular office furniture, and under cabinet lighting illuminating a countertop work surface.

INCORPORATION BY REFERENCE AND OTHER REFERENCES

Applicant incorporates by reference the following: U.S. Design Pat. No. D603,549, Nov. 2009, Ng; U.S. Pat. No. 7,810,995, Oct. 2010, Stimac, et al.; and U.S. Pat. No. 6,641,283, Nov. 2003, Bohler. Other references cited herein include "LED Linear Lighting, Lumentask Undercabinet Lighting", GM Lighting LLC, www.gmlighting.net/PDF/101909 gmcatalog.pdf; LED Undercabinet and Linear Lighting Solutions, Juno Lighting LLC, www.junolightinggroup.com/literature/UndercabinetBrochure.pdf; Monochromatic Catalog, Boca Flasher, Inc., www.bocaflashercom/monochromatic-catalog.

BACKGROUND OF THE INVENTION

Development of high-brightness LEDs, and their incorporation into Lamps designed to replace incandescent bulbs has revolutionized the lighting industry in recent years. One of the advantages of an LED lamp over an incandescent lamp is its greater efficiency in converting electric energy into light. This measure of how well a light source produces visible light is known as luminous efficacy. A typical incandescent bulb produces about 14-17.5 lumens per watt, and most halogen lamps produce about 16-24 lumens per watt. In comparison, LEDs achieving 80-150 lumens per watt are now common. Even when considering the power that is lost in the driving circuitry of an LED lamp which may be 60-80% efficient, LED lamps that are three to six times as efficient as incandescent and halogen bulbs are easily achievable. Thus an LED lamp designed to replace a halogen bulb lamp would draw much less power from the AC mains. In installations employing many such light fixtures, a great savings in electric energy can be realized by replacing the halogen lamps with comparable LED Lamps.

Lamps employing fluorescent bulbs are common due to their increased efficiency over incandescent, however fluorescent bulbs have other undesirable characteristics. Fluorescent light tubes contain a small quantity of mercury that can be harmful to the environment and to human health. In order to properly dispose of the fluorescent lights special care must be taken and special hazardous waste landfills must be used. Thus, proper disposal of fluorescent lamps is expensive, and the more common improper disposal is damaging to the environment. For these and other reasons, LED based lamps are becoming mainstream in the lighting industry.

As LED lighting manufacturers have sought to get the most luminous intensity from their products in order to replace incandescent and fluorescent lights, they have naturally sought the brightest LEDs. LED manufacturers continually strive to get the most luminous efficacy from their LEDs. Common in the industry are 1 Watt LEDs which are now approaching 150 lumens. These 1 Watt LEDs are commonly seen in linear lighting products, spaced an inch or more apart in a linear row. Because of the heat generated by the LEDs, which must be dissipated away from the LEDs in order to prevent damage to the die and in order to get the most life out of the product, these 1 Watt LEDs can't practically be spaced any closer to each other. All LED lighting designers face the same common challenges of heat dissipation, luminous intensity, price point efficiency, product reliability, etc. Thus, in terms of linear LED lighting products, 1 Watt LEDs are commonly used and spaced as described. Examples of these existing prior art linear Products include HPNLS and HPNFC from Boca Flasher, Inc., Lumentask Undercabinet Lighting from GM Lighting LLC, and LED Undercabinet and Linear Lighting products from Juno Lighting LLC. FIG. 1 shows a common prior-art linear LED task light with 1 Watt LEDs (102) mounted to a PCB (104) contained in a thermally conductive housing (106).

While these linear LED lighting products all have the advantages over incandescent and fluorescent lights that were discussed above, they suffer from one disadvantage which becomes amplified when the products are used to illuminate an area or surface that is in close proximity to the lamp. This disadvantage is in the uneven lighting pattern that results from the nature of the LEDs themselves.

Unlike incandescent and fluorescent bulbs, LEDs are directional light sources. That is, LEDs emit light with an intensity that is greatest when viewed on-axis, and drops off as you move off axis. LEDs are lambertian emitters, which obey Lambert's cosine law. Lambert's cosine law says that the radiant intensity or luminous intensity observed from an ideal diffuse radiator is directly proportional to the cosine of the angle $\theta$ between the observer's line of sight and the surface normal. The law is also known as the cosine emission law or Lambert's emission law. FIG. 2 shows a graph of this lambertian radiation pattern.

In practice, LED manufacturers typically add a small lens to the surface of the LED to modify this emission pattern by widening or narrowing the intensity profile. The intensity pattern of the LEDs is often specified by the manufacturers as a beam angle. The beam angle is the angle between those points on opposite sides of the beam axis where the intensity drops to 50% of maximum. It can be seen from FIG. 2 that the beam angle of a simple lambertian emitter is 120°. Even when widened or narrowed by the manufacturer's lens, the light pattern is always greatest directly on-axis with the LED.

LED lighting manufacturers must deal with this LED optical property when designing LED lighting products. Depending on the desired characteristics of the light, various methods of focusing or diffusing the light with secondary lenses, reflectors, directional optics, multiple mounting planes, diffusing covers, etc. are sometimes employed. However, these secondary optics add to the cost of the lighting product. When possible, a simple opaque or frosted cover on the LED lamp is used, and is often acceptable when the illuminated surface is sufficiently distant from the lamp so that the pattern of light from each LED can overlap and blend.

The emission pattern of light from these prior-art linear LED lights becomes problematic when the light is used to illuminate a close proximity surface such as with under cabinet lighting or task lighting in modular office furniture. In these and other task light applications, the lights are typically within 18 inches of the surface that they are illuminating.

FIGS. 3 and 4 illustrate this problem. FIG. 3 shows the non-uniform illumination pattern resulting from a surface (320) that is relatively close to a multiple point-source light (300). In this case, the LED emitters (310) each produce a circle of higher intensity illumination which may overlap but, do to the short distance to the work surface (320), do not sufficiently "blend" into an even illumination pattern (330).

FIG. 4 shows another undesirable effect of close-proximity, multiple point-source lighting such as is common in prior-art products. Referring to FIG. 4, each LED (410) can be seen as a point-source of light illuminating a close object (420). the LEDs (410) each illuminate the object (420) from a different angle relative to the work surface (430), and therefore each produce a unique shadow (440) on the work surface (430). The result is a multiple "stepped" shadow (440) of the object (420) which emanates out in linear fashion parallel to the linear light (400). This multiple point-source shadowing can be dramatic and unpleasing.

Because of the above described deficiencies with prior art LED lamps, there exists a need in the industry for a linear LED task light capable of evenly illuminating close proximity work surfaces while minimizing point-source shadowing, without requiring expensive secondary optics or reflectors to achieve the same.

It is an object of the present invention to provide a complete linear LED task light which satisfies energy code requirements of a maximum 7½ Watts per foot under normal operation, capable of evenly illuminating a close proximity work surface, and which minimizes the effects of multiple point-source shadowing seen with prior-art lights. It is a further object of the present invention to comply with all LEED certification requirements, and to be California Title 24 compliant. It is a further object of the present invention to provide a selectable higher capacity illumination mode using greater than 7½ Watts per foot, with an integral timer which reduces the output after a preset interval. It is a further object of the present invention to save power by automatically shutting off when no one is occupying the work area.

SUMMARY OF THE INVENTION

The present invention is directed to a linear LED Task Light which satisfies energy code requirements of a maximum 7½ Watts per foot under normal operation, which evenly illuminates close proximity work surfaces, complies with all LEED certification requirements, and which is California Title 24 compliant. An advantage of the present invention is that it minimizes the effects of multiple point-source shadowing seen with prior-art LED lights. A further advantage of the present invention is that it provides a selectable higher capacity illumination mode using greater than 7½ Watts per foot, with an integral timer that reduces the output intensity after a preset interval, so that it maintains energy code requirements. A further advantage of the present invention is that it saves power by automatically shutting off when no one occupies the work area for a preset amount of time. Further advantages of the invention will become apparent to those of ordinary skill in the art through the disclosure herein.

DETAILED DESCRIPTION OF THE INVENTION

Figure 5:
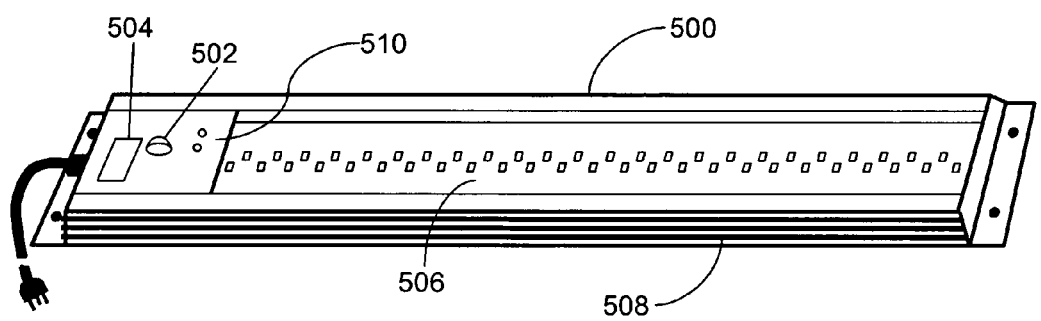
FIG. 5 is a drawing.

FIG. 5 is a simplified drawing of one embodiment of the present invention. The present invention includes a thermally conductive housing (500) designed to conduct heat away from sensitive electronic components on the printed circuit board (506), and through convection, dissipate the heat into the surrounding air via thermal fins (508). An important feature of the present invention is the touch sensitive control panel (510) with intensity input selector (504), and proximity sensor (502).

The input selector (504) allows the user to select from multiple pre-programmed illumination intensities depending on the desired brightness. With this feature, the present invention has the capability to function as a low illumination accent light as well as a work surface task light.

A primary advantage of the present invention over prior art implementations is achieved through the incorporation of the proximity sensor (502). This integral sensor detects whether a person is in the same vicinity as the LED Task Light, indicating that the area is "occupied" or conversely that the area is vacant. Onboard circuitry (not shown) includes a timer which is programmed to turn off the light and enter a power saving mode after a preset interval of "vacancy". Once the proximity sensor (502) detects that the area is again occupied, the control circuitry returns the LED output to the previous illumination state. Thus, the LED Task Light can be set to the desired illumination output once, and the light will automatically turn off when the user leaves the area, and back on when the user returns.

Since one of the primary advantages of LED lighting is its energy efficiency, this occupancy sensing feature of the present invention provides an attractive advantage over existing prior art implementations. With prior art LED task lights, no matter how efficient the design, energy is still wasted when the area is unoccupied and the light is left on.

Figure 6:
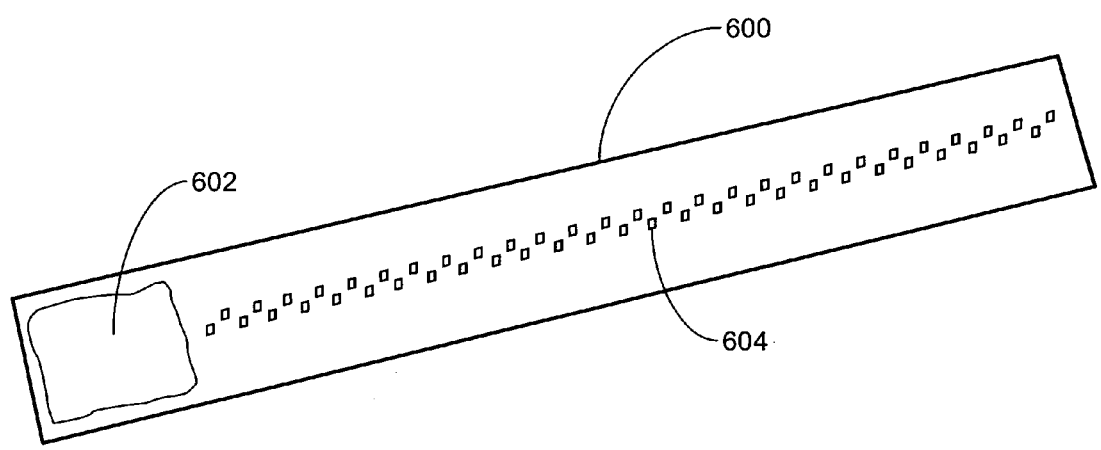
FIG. 6 is a drawing.

FIG. 6 is a simplified drawing of the printed circuit board (PCB) contained in one embodiment of the present invention. Referring to FIG. 6, the PCB (600) contains the driving and control circuitry (602) which powers the LEDs (604). A key advantage of the present invention is the unique placement arrangement, quantity, and beam angle of the LEDs (604) which provides a more even distribution of light and a better price point efficiency in terms of dollars per Watt over prior art implementations.

Figure 1:
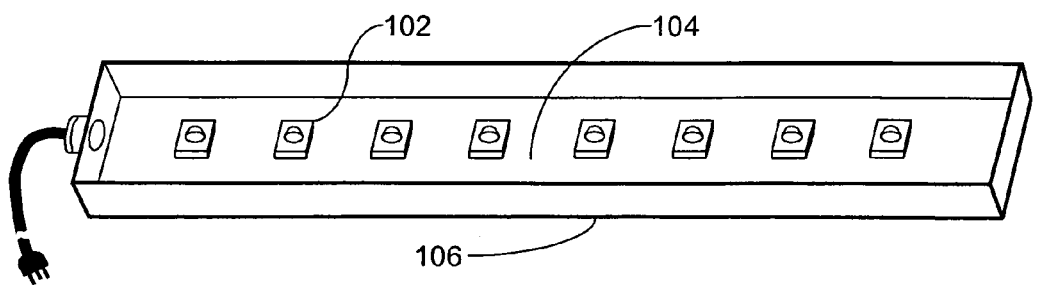
FIG. 1 is a drawing of a prior-art.
Figure 2:
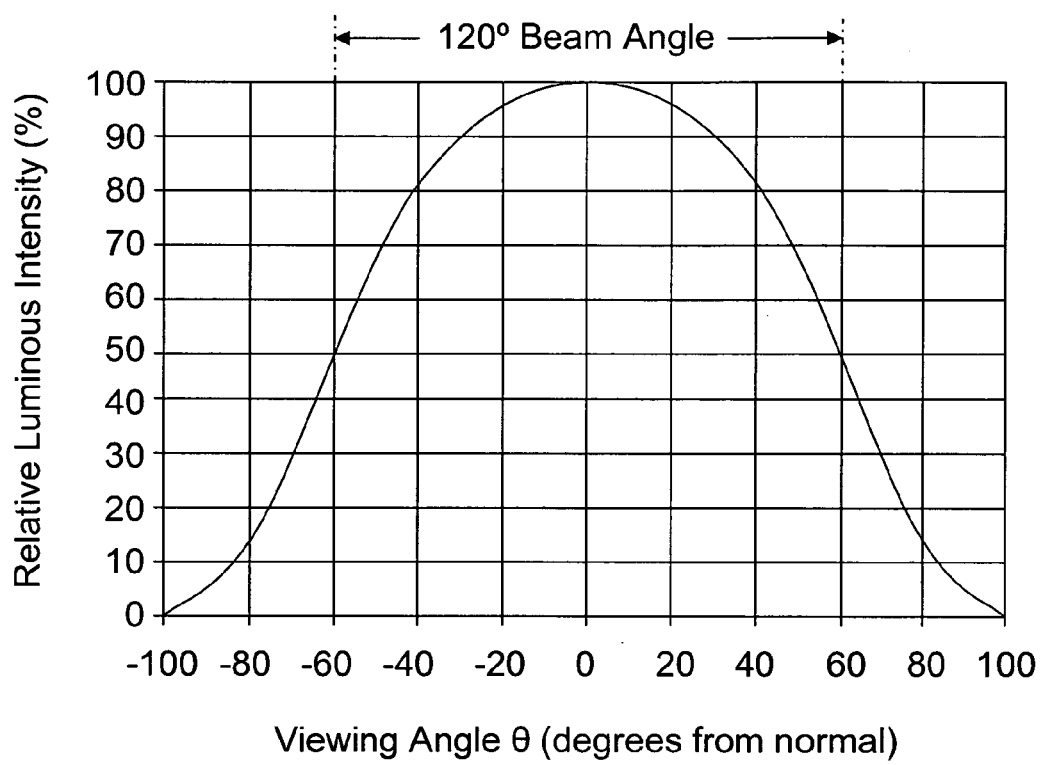
FIG. 2 is a graph of the prior art.

As explained in the background section above, LED manufacturers typically add a small lens to the surface of the LED to modify the normal Lambertian emission pattern by widening or narrowing the intensity profile. The intensity profile of the LEDs is specified by the manufacturers as a beam angle which is the angle between those points on opposite sides of the beam axis where the intensity drops to 50% of maximum. As shown in FIG. 2, the beam angle of a simple Lambertian emitter is 120°. The LEDs used in this embodiment have integral lenses which achieve a beam angle of 160 degrees, effectively spreading the light over a wider area than the basic 120 degree beam angle.

Figure 7:
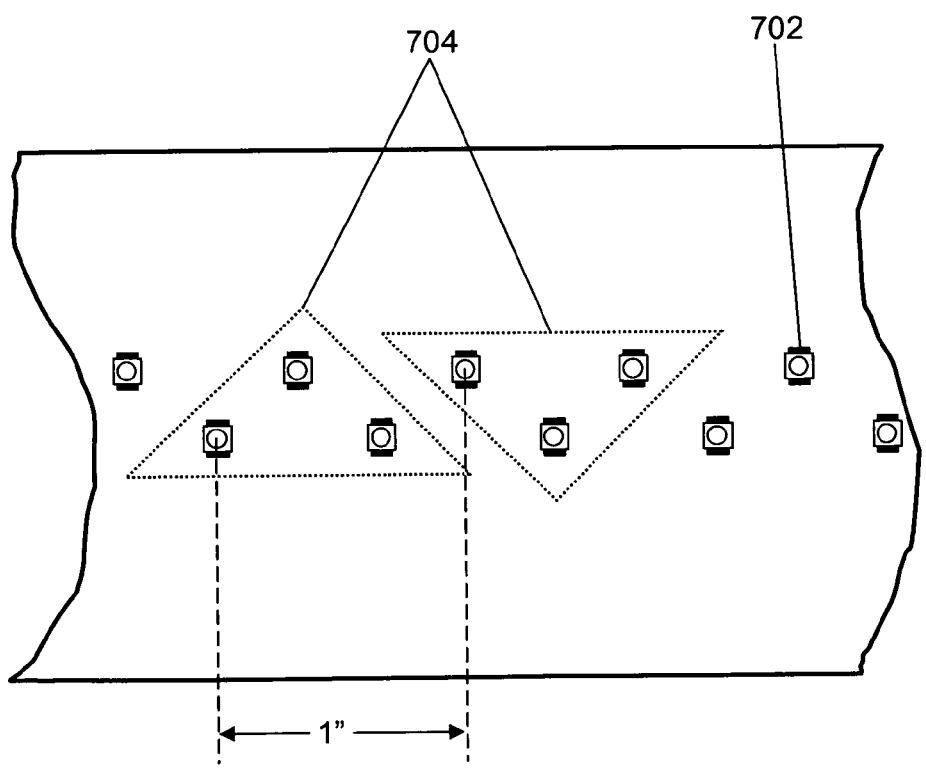
FIG. 7 is a close-up.

FIG. 7 is a cut-away section of the PCB of FIG. 6 showing the LED placement in greater detail. Referring to FIG. 7, the LEDs (702) are alternated in two separate linear rows such that they form triangular groupings (704). The LEDs used in this embodiment are ⅓ Watt sized as opposed to the 1 Watt size LEDs common in prior art implementations. It can be seen in FIG. 7 that three ⅓ Watt LEDs are placed along every one linear inch to maintain the approximate 1 Watt per inch power density described in the background section above as a commonly accepted maximum. One advantage realized in the present invention over prior art implementations is that this 1 Watt per inch power density is achieved with three separate point sources of light every inch as opposed to one.

Figure 3:
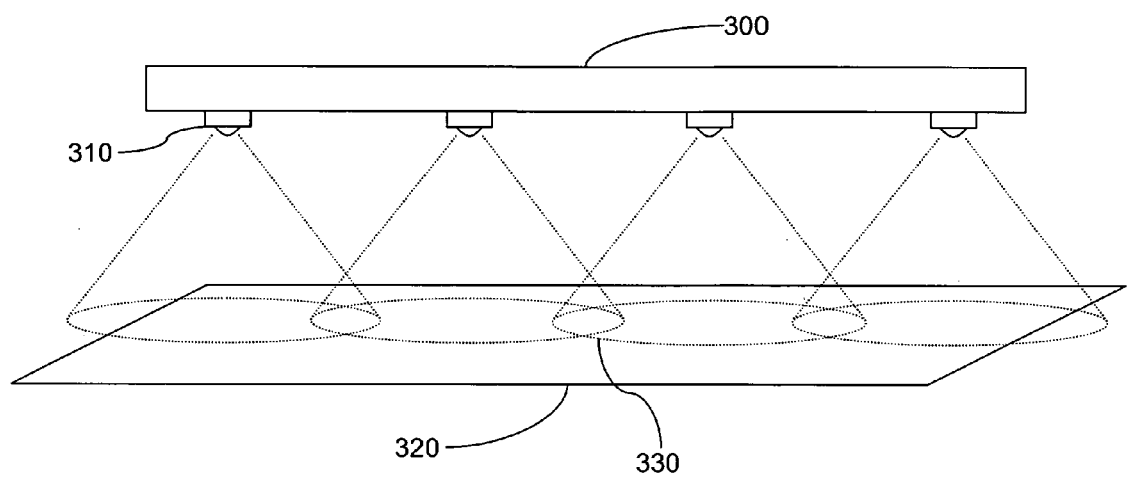
FIG. 3 is an illustration of the prior art of FIG. 1.
Figure 4:
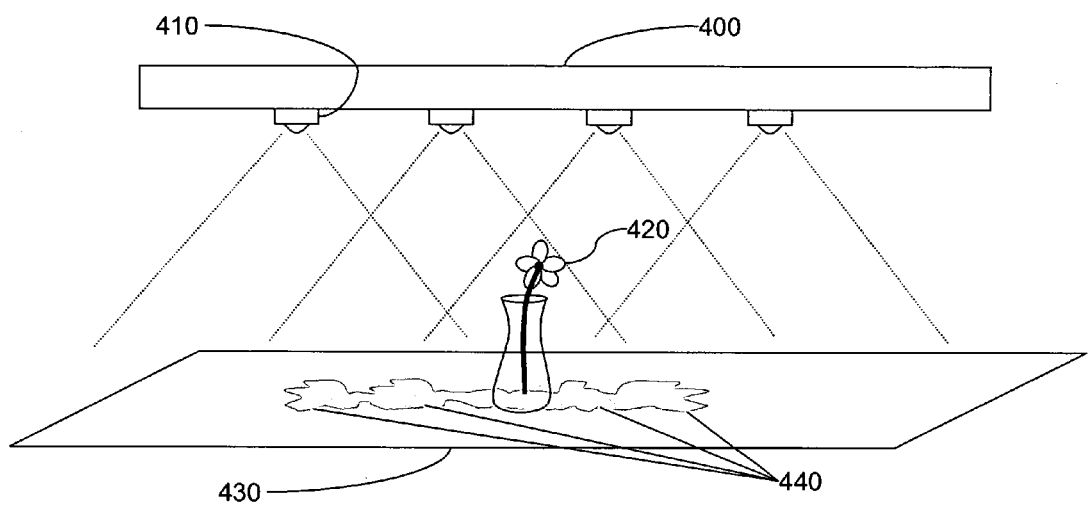
FIG. 4 is an illustration of the implementation of the prior art.

These three point sources arranged in a triangular grouping, combined with the wide 160 degree beam angle of the LEDs provide for much better light fill and blending of the light in a shorter distance than with prior art implementations. The result is a more uniform illumination intensity pattern over that shown in FIG. 3, which in turn reduces the multiple point-source shadowing typical of prior art linear LED task lights shown in FIG. 4. Other manufacturers have tried to achieve a more even illumination through the use of reflectors, secondary optics, and other costly methods. However, the present invention requires only a mildly frosted sheet lens to further soften and blend the light, eliminating the need for such prior art costly secondary optics.

Another advantage the present invention achieves over prior art implementations is that this uniform illumination is realized while reducing the cost per lumen through the use of the smaller LEDs. The ⅓ Watt LEDs used in this embodiment of the present invention achieve a better price point efficiency than 1 Watt LEDs because they are available for much lower than ⅓ the cost of 1 Watt LEDs, more than offsetting the 3× quantity required. This provides for a lower cost product giving further advantage over prior art implementations.

Existing energy code requirements of 7½ Watts per foot are achieved in the present invention by under driving the LEDs to 62% of their rated maximum current during normal operation. Referencing FIG. 7, the LEDs (702) grouped into triangular patterns (704) are shown to be populated in a density of three per inch. When driven at their rated current, these LEDs would use ⅓ Watts each or 1 Watt per inch which equals 12 Watts per foot. Driving them at 62% of their rated current results in roughly 62% of this wattage, which equals approximately 7.5 Watts per foot.

The present invention achieves another advantage over prior art implementations due to the ability to fully drive the LEDs and achieve a brighter illumination output without sacrificing energy code compliance. The on-board control circuitry (602) (FIG. 6) combined with the intensity input selector (504) on the touch sensitive control panel (510) (both in FIG. 5), allow the user to select a temporary higher illumination state whereby the LEDs are driven at maximum power, achieving 12 Watts per foot. The timer circuit in the control circuitry (602) returns the output to the normal 7½ Watts per foot after a preset interval, thus maintaining energy code compliancy. This selectable temporary higher illumination of the present invention allows for special lighting requirements such as "cleaning crew mode" providing a further advantage over prior art implementations.

What is claimed is:

1. An LED Task Lamp for achieving uniform illumination of a work surface and decreasing multiple point-source shadowing comprising:
   One or more high-power LEDs, and
   control and driving circuitry powering said LEDs, and
   a thermally conductive enclosure providing a path to transfer heat from said LEDs through said enclosure and into surrounding air,
   said enclosure being substantially greater in length than width or height; and
   a control panel providing input to said control and driving circuitry, said control panel comprising:
      a selector providing means for manually selecting one of multiple output illumination intensities of said LEDs, and
      a proximity sensing device sensing the presence or absence of a person within a pre-set distance of said LED lamp;
   wherein
      said proximity sensing device
         causes said LED lamp to enter a power saving, lower illumination mode after a preset time interval during which no person is detected within a preset distance of said LED lamp, and
         causes said LED lamp to return to a higher illumination mode upon detecting a person entering a preset proximity to said LED lamp; and
   wherein said LEDs
      are arranged in two or more linear rows, alternating in their placement within said linear rows, such that a staggered pattern is achieved, with any three adjacent LEDs forming a triangle.

2. The LED Task Lamp of claim 1 wherein said LEDs are arranged such that there averages three LEDs per linear inch.

3. The LED Task Lamp of claim 2 wherein said LEDs are one third watt rated.

4. The LED Task lamp of claim 1 wherein said multiple output illumination intensities of said LEDs include a task mode, said task mode being an output illumination achieved by driving said LEDs such that no more than 7½ Watts of power is consumed per linear foot of length of said LED lamp.

5. The LED Task lamp of claim 1 wherein said multiple output illumination intensities of said LEDs include an accent lighting mode, said accent lighting mode being an output illumination achieved by driving said LEDs such that less than 7½ Watts of power is consumed per linear foot of length of said LED lamp.

6. The LED Task lamp of claim 1 wherein said multiple output illumination intensities of said LEDs include a cleaning mode, said cleaning mode being an output illumination achieved by driving said LEDs such that greater than 7½ Watts of power is consumed per linear foot of length of said LED lamp.

7. The LED Task lamp of claim 6 wherein said cleaning mode is a temporary state of operation limited in duration, such that after a preset time interval said output illumination intensity is reduced to an intensity consuming no more than 7½ Watts of power per linear foot of length of said LED lamp.

8. The LED Task lamp of claim 1 wherein said lower illumination mode is "off".

* * * * *